United States Patent
Hayama et al.

(10) Patent No.: US 11,512,786 B2
(45) Date of Patent: Nov. 29, 2022

(54) CAPACITY CONTROL VALVE AND CONTROL METHOD FOR CAPACITY CONTROL VALVE

(71) Applicant: EAGLE INDUSTRY CO., LTD., Tokyo (JP)

(72) Inventors: Masahiro Hayama, Tokyo (JP); Yoshihiro Ogawa, Tokyo (JP); Keigo Shirafuji, Tokyo (JP); Kohei Fukudome, Tokyo (JP); Daichi Kurihara, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/766,124

(22) PCT Filed: Nov. 28, 2018

(86) PCT No.: PCT/JP2018/043652
§ 371 (c)(1),
(2) Date: May 21, 2020

(87) PCT Pub. No.: WO2019/107377
PCT Pub. Date: Jun. 6, 2019

(65) Prior Publication Data
US 2020/0362974 A1    Nov. 19, 2020

(30) Foreign Application Priority Data
Nov. 30, 2017 (JP) .............................. JP2017-231303

(51) Int. Cl.
F16K 11/24 (2006.01)
F04B 49/22 (2006.01)
F16K 17/18 (2006.01)

(52) U.S. Cl.
CPC .............. *F16K 11/24* (2013.01); *F04B 49/22* (2013.01); *F16K 17/18* (2013.01); *Y10T 137/86702* (2015.04)

(58) Field of Classification Search
CPC .. Y10T 137/86702; F04B 49/22; F04B 27/18; G05D 7/0635; F16K 11/22; F16K 11/24; F16K 17/18
(Continued)

(56) References Cited

U.S. PATENT DOCUMENTS 2,267,515 A * 12/1941 Wilcox ............... F16K 31/0627
137/625.65
3,360,304 A * 12/1967 Adams ..................... B61K 7/12
303/18

(Continued)

FOREIGN PATENT DOCUMENTS

| CN | 111279076 | 6/2020 | .............. F04B 27/18 |
| CN | 111316028 | 6/2020 | .............. F16K 31/06 |

(Continued)

OTHER PUBLICATIONS

International Search Report (ISR) dated Feb. 19, 2019, issued for International application No. PCT/JP2018/043652. (1 page).

(Continued)

*Primary Examiner* — William M McCalister
(74) *Attorney, Agent, or Firm* — Hayes Soloway P.C.

(57) ABSTRACT

A capacity control valve, which can efficiently discharge a liquid refrigerant and reduce the driving force of a compressor, includes: a valve main body (10) including a first communication passage (11), a second communication passage (12), a third communication passage (13) and a main valve seat (15a); a valve body (20) including an intermediate communication passage (29), a main valve part (21c) and an auxiliary valve part (23d); a solenoid (30) which drives a rod (Continued)

(36) having an auxiliary valve seat (26c); a first biasing member (43) which biases the main valve part (21c) in the valve closing direction thereof; and a second biasing member (37) which biases the main valve part (21c) in the valve opening direction thereof, and the rod (36) relatively moves to the valve body (20), and opens and closes the auxiliary valve part (23d).

14 Claims, 7 Drawing Sheets

(58) Field of Classification Search
USPC .................................................. 137/625.68
See application file for complete search history.

(56) References Cited

U.S. PATENT DOCUMENTS

| | | | | |
|---|---|---|---|---|
| 3,483,888 | A | 12/1969 | Hugo | F16K 15/046 |
| 1,614,002 | A | 1/1972 | Horton | A62C 35/605 |
| 4,364,615 | A | 12/1982 | Euler | F16C 27/04 |
| 4,579,145 | A * | 4/1986 | Leiber | F16H 61/0251 137/625.65 |
| 4,615,358 | A * | 10/1986 | Hammond | F15B 13/0402 137/596.17 |
| 4,895,192 | A * | 1/1990 | Mortenson | F01M 11/04 137/625.68 |
| 4,917,150 | A * | 4/1990 | Koch | F16K 31/0606 137/625.65 |
| 4,979,542 | A * | 12/1990 | Mesenich | F02M 47/027 137/625.27 |
| 4,998,559 | A * | 3/1991 | McAuliffe, Jr. | F16H 61/0251 137/596.17 |
| 5,060,695 | A * | 10/1991 | McCabe | G05D 16/2024 137/625.61 |
| 5,217,047 | A * | 6/1993 | McCabe | F16H 61/0251 137/625.61 |
| 5,263,694 | A | 11/1993 | Smith | B60G 15/068 |
| 5,702,235 | A | 12/1997 | Hirota | F04B 27/1804 |
| 5,778,932 | A * | 7/1998 | Alexander | G05D 16/2024 137/625.65 |
| 6,010,312 | A | 1/2000 | Suitou | F04B 27/1804 |
| 6,161,585 | A * | 12/2000 | Kolchinsky | G05D 16/2024 137/625.65 |
| 6,361,283 | B1 | 3/2002 | Ota | F04B 27/1084 |
| 6,481,976 | B2 | 11/2002 | Kimura | F04B 27/1804 |
| 7,533,687 | B2 | 5/2009 | Uemura | F16K 27/048 |
| 8,021,124 | B2 | 9/2011 | Umemura | F04B 27/1804 |
| 8,079,827 | B2 | 12/2011 | Iwa | F04B 27/1804 |
| 8,225,818 | B1 * | 7/2012 | Stephens | F15B 13/0442 137/625.68 |
| 8,651,826 | B2 | 2/2014 | Futakuchi | F04B 27/1804 |
| 9,022,346 | B2 * | 5/2015 | Najmolhoda | F16K 31/0613 251/50 |
| 9,027,598 | B2 * | 5/2015 | Schneider | F16K 31/0613 137/625.68 |
| 9,132,714 | B2 | 9/2015 | Futakuchi | F04B 27/1804 |
| 9,297,373 | B2 | 3/2016 | Bagagli | F16K 15/026 |
| 9,400,027 | B2 | 7/2016 | Imaizumi | F16K 1/32 |
| 9,453,518 | B2 * | 9/2016 | Schulz | F15B 13/043 |
| 9,581,149 | B2 | 2/2017 | Ota et al. | F04B 27/1804 |
| 9,581,150 | B2 | 2/2017 | Ota et al. | F04B 27/1804 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,519,944 | B2 | 12/2019 | Taguchi | F04B 27/1804 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 2001/0003573 | A1 | 6/2001 | Kimura et al. | 417/222.2 |
| 2002/0134444 | A1 * | 9/2002 | Isobe | F16K 27/041 137/625.65 |
| 2003/0145615 | A1 | 8/2003 | Sasaki | F16K 31/0637 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2005/0076959 | A1 * | 4/2005 | Yamamoto | F16K 31/0624 137/596.17 |
| 2005/0151310 | A1 | 7/2005 | Rodeffer | F16F 1/32 |
| 2007/0214814 | A1 | 9/2007 | Umemura et al. | |
| 2007/0264134 | A1 | 11/2007 | Hirota | F04B 27/1804 |
| 2008/0138213 | A1 | 6/2008 | Umemura et al. | 417/222.2 |
| 2008/0175727 | A1 | 7/2008 | Umemura et al. | F04B 49/22 |
| 2009/0108221 | A1 | 4/2009 | Umemura et al. | 251/129.15 |
| 2009/0114871 | A1 | 5/2009 | Iwa | F04B 27/14 |
| 2009/0183786 | A1 | 7/2009 | Iwa et al. | |
| 2009/0256091 | A1 * | 10/2009 | Nordstrom | F16K 31/0613 251/129.15 |
| 2010/0282991 | A1 | 11/2010 | Okamoto | F16K 31/02 |
| 2011/0061749 | A1 | 3/2011 | Okamoto | F16K 31/0655 |
| 2011/0089352 | A1 * | 4/2011 | Morgan | F16K 11/0716 251/129.15 |
| 2012/0056113 | A1 | 3/2012 | Tano | F04B 27/1804 |
| 2012/0198992 | A1 | 8/2012 | Futakuchi et al. | 91/505 |
| 2012/0198993 | A1 | 8/2012 | Fukudome | 91/505 |
| 2012/0211686 | A1 | 8/2012 | Okamoto | F16K 31/0655 |
| 2013/0291963 | A1 | 11/2013 | Futakuchi et al. | 137/487.5 |
| 2014/0099214 | A1 | 4/2014 | Fukudome | 417/222.2 |
| 2014/0130916 | A1 | 5/2014 | Saeki | F16K 31/0613 |
| 2014/0294632 | A1 | 10/2014 | Kondo et al. | 417/434 |
| 2014/0369862 | A1 | 12/2014 | Ota et al. | F04B 27/1804 |
| 2015/0021131 | A1 | 1/2015 | Wootten | F16F 9/348 |
| 2015/0027573 | A1 * | 1/2015 | Ochiai | F15B 13/0402 137/625.65 |
| 2015/0044067 | A1 | 2/2015 | Ota et al. | F04B 27/1804 |
| 2015/0068628 | A1 | 3/2015 | Iwa | 137/625.65 |
| 2015/0104334 | A1 | 4/2015 | Ota et al. | F04B 27/1804 |
| 2015/0275874 | A1 | 10/2015 | Ota | F04B 27/1804 |
| 2015/0345655 | A1 | 12/2015 | Higashidozono | 137/624.27 |
| 2016/0053755 | A1 | 2/2016 | Taguchi | F04B 49/22 |
| 2016/0290326 | A1 | 10/2016 | Sugamura | F04B 27/1804 |
| 2017/0284562 | A1 | 10/2017 | Hayama | F16K 41/00 |
| 2018/0156345 | A1 * | 6/2018 | Kanda | F15B 13/0431 |
| 2018/0187793 | A1 | 7/2018 | Futakuchi | F04B 39/08 |
| 2018/0291888 | A1 | 10/2018 | Tonegawa et al. | F04B 49/22 |
| 2019/0162175 | A1 | 5/2019 | Higashidozono | F04B 27/18 |
| 2020/0032781 | A1 | 1/2020 | Higashidozono | F16K 31/0624 |
| 2020/0309105 | A1 | 10/2020 | Hayama et al. | F04B 27/18 |
| 2020/0318624 | A1 | 10/2020 | Hayama | F04B 27/18 |
| 2020/0332786 | A1 | 10/2020 | Hayama | F04B 27/1804 |
| 2020/0362974 | A1 | 11/2020 | Hayama et al. | F16K 11/24 |
| 2020/0370545 | A1 | 11/2020 | Hayama et al. | F04B 27/18 |
| 2021/0372396 | A1 | 12/2021 | Kurihara | G05D 7/0635 |

FOREIGN PATENT DOCUMENTS

| | | | |
|---|---|---|---|
| CN | 111417780 | 7/2020 | F04B 27/18 |
| EP | 2594794 | 5/2013 | F04B 27/18 |
| EP | 3726054 | 10/2020 | F04B 27/18 |
| JP | 6-26454 | 2/1994 | F04B 27/08 |
| JP | 2001165055 | 6/2001 | F04B 27/14 |
| JP | 2004003468 | 1/2004 | F04B 27/14 |
| JP | 2005307817 A | 11/2005 | |
| JP | 2007247512 | 9/2007 | F04B 27/14 |
| JP | 2008157031 | 7/2008 | F04B 27/14 |
| JP | 2009275550 | 11/2009 | F04B 49/00 |
| JP | 2012144986 | 8/2012 | F04B 27/14 |
| JP | 2012211579 | 11/2012 | F04B 27/14 |
| JP | 5167121 B2 | 3/2013 | |
| JP | 2014080927 A | 5/2014 | |
| JP | 2014092207 | 5/2014 | F16K 31/06 |
| JP | 2014095463 A | 5/2014 | |
| JP | 2014194180 | 10/2014 | F04B 27/14 |
| JP | 201575054 | 4/2015 | |
| JP | 20151168 | 5/2015 | F04B 27/14 |
| JP | 2015137546 | 7/2015 | F04B 27/14 |
| JP | 2015178795 | 10/2015 | F04B 27/14 |
| JP | 5983539 | 8/2016 | F04B 27/18 |
| JP | 2016196825 | 11/2016 | F04B 27/18 |
| JP | 2016196876 | 11/2016 | F04B 27/18 |

(56) References Cited

FOREIGN PATENT DOCUMENTS

| JP | 2016205404 | 12/2016 | ............ F04B 27/18 |
|---|---|---|---|
| JP | 6135521 | 5/2017 | ............ F04B 27/18 |
| JP | 2017089832 | 5/2017 | ............ F16K 31/06 |
| JP | 2018179087 | 11/2018 | ............ F16K 31/06 |
| WO | WO2007119380 | 10/2007 | ............ F04B 27/14 |
| WO | WO2009025298 | 2/2009 | ............ F16K 31/06 |
| WO | WO2011114841 | 9/2011 | ............ F04B 27/14 |
| WO | WO2012077439 | 6/2012 | ............ F04B 27/14 |
| WO | WO2014119594 | 8/2014 | ............ F04B 27/14 |
| WO | WO-2014119594 A1 * | 8/2014 | ......... F04B 27/1804 |
| WO | WO2014148367 | 9/2014 | ............ F16K 31/06 |
| WO | WO2006090760 | 8/2016 | ............ F04B 27/18 |

OTHER PUBLICATIONS

U.S. Appl. No. 16/480,281, filed Jul. 23, 2019, Higashidozono et al.
U.S. Appl. No. 16/483,621, filed Aug. 5, 2019, Higashidozono et al.
U.S. Appl. No. 16/763,800, filed May 13, 2020, Hayama et al.
U.S. Appl. No. 16/766,096, filed May 21, 2020, Kurihara et al.
U.S. Appl. No. 16/957,340, filed Jun. 23, 2020, Hayama et al.
U.S. Appl. No. 16/957,344, filed Jun. 23, 2020, Hayama et al.
U.S. Appl. No. 16/961,620, filed Jul. 10, 2020, Hayama et al.
U.S. Appl. No. 17/293,435, filed May 12, 2021, Hayama et al.
U.S. Appl. No. 16/772,703, filed Jun. 12, 2020, Hayama et al.
U.S. Appl. No. 14/431,270, filed Mar. 25, 2015, Higashidozono et al.
The First Office Action issued in Chinese Patent Appln. Serial No. 201880081296.0, dated Jul. 5, 2021, with English translation, 9 gages.
Extended European Search Report issued in European Patent Appln. Serial No. 18896700.4, dated Aug. 12, 2021, 8 pages.
European Official Action issued in related European Patent Application Serial No. 18885296.6, dated Jan. 21, 2022, 4 pages.
European Official Action issued in related European Patent Application Serial No. 18897846.4, dated Apr. 14, 2022 (5 pgs).
European Official Action issued in related European Patent Application Serial No. 19890548.1, dated May 24, 2022 (6 pgs).
European Official Action issued in related European Patent Application Serial No. 18884020.1, dated Jun. 28, 2022 (4 pgs).
Korean Official Action issued in related Korean Patent Application Serial No. 10-2020-7013914, dated Mar. 15, 2022 (5 pgs).
Chinese Office Action issued in Chinese Patent Appln. Serial No. 201880080867.9, dated Mar. 16, 2022, with English translation, 13 pages.
Chinese Office Action issued in Chinese Patent Appln. Serial No. 201880072030.X, dated Jun. 6, 2022, with English translation, 12 pages.
Japanese Office Action issued in Japanese Patent Appln. Serial No. 2019-562060, dated May 10, 2022, with English translation, 8 pages.
Japanese Office Action issued in Japanese Patent Appln. Serial No. 2019-562061, dated May 10, 2022, with English translation, 10 pages.
International Preliminary Report on Patentability issued in PCT/JP2018/047716, dated Jun, 30, 2020, 8 pages.
International Starch Report and Written Opinion issued in PCIAP2018/047716, dated Mar. 26, 2019, with English translation, 14 pages.
International Preliminary Report on Patentability issued in PCT/JP2014/051901, dated Aug. 13, 2015, 7 pages.
International Seareh Report issued in PCT/JP2014/051901, dated Apr. 18, 2014, 4 pages.
International Preliminary Report on Patentability, International Search Report and Written Opinion issued in PCT/JP2019/045731, dated Feb. 4, 2020, 21 pages.
International Search Report issued in PCT/JP2018/004500, dated May 15, 2018, 12 pages.
International Preliminary Report on Patentability issued in PCT/JP2018/1004500, dated Aug. 20, 2019, 4pages.
International Search Report issued in PCT/JP2018/041768, dated Jan. 22, 2019, 12 pages.
International Preliminary Report on Patentability issued in PCT/JP2018/041768, dated May 19, 2020, 6 pages.
International Search Report issued in PCT/JP2018/002084, dated Apr. 17, 2018, 11 pages.
International Preliminary Report on Patentability issued in PCT/JP2018/002084, dated Jul. 30, 2019, 4 pages.
International Search Report issued in PCT/JP2018/047693, dated Mar. 19, 2019, 11 pages.
International Preliminary Report on Patentability issued in PCT/JP2018/047693, dated Jun. 30, 2020, 4 pages.
International Search Report issued in PCT/JP2018/047694, dated Mar. 19, 2019, 20 pages.
International Preliminary Report on Patentability issued in PCT/JP2018/047694, dated Jun. 30, 2020, 7 pages.
International Search Report issued in PCT/JP2018/045010, dated Feb. 26, 2019, 11 pages.
International Preliminary Report on Patentability issued in PCT/JP2018/045010, dated Jun. 9, 2020, 4 pages.
International Search Report issued in PCT/JP2019/001569, dated Apr. 16, 2019, 20 pages
International Preliminary Report on Patentability issued in PCT/JP2019/001569, dated Oct. 15, 2018, 7 pages.
International Search Report and Written Opinion with translation issued in PCT/JP2019/001570, dated Jul. 25, 2019 (19 pages).
International Preliminary Report on Patentability with translation issued in PCT/JP2019/001570, dated Jul. 28, 2020 (6 pages).
International Search Report and Written Opinion with translation issued in PCT/JP2018/043652, dated Feb. 19, 2019 (21 pages).
International Preliminary Report on Patentability with translation issued in PCT/JP2018/043652, dated Jun. 2, 2020 (7 pages).
International Search Report and Written Opinion with translation issued in PCT/JP2018/045782, dated Feb. 26, 2019 (11 pages).
International Preliminary Report on Patentability with translation issued in PCT/JP2018/045782, dated Jun. 16, 2020 (4 pages).
Official Action issued in related U.S. Appl. No. 16/957,340, dated Feb. 4, 2022 (18 pgs).
Official Action issued in related U.S. Appl. No. 16/957,340, dated Sep. 20, 2021 (18 pgs).
Notice of Allowance issued in related U.S. Appl. No. 16/961,620, dated Feb. 9, 2022 (6 pgs).
Notice of Allowance issued in related U.S. Appl. No. 16/772,703, dated Oct. 13, 2021 (5 pgs).
Official Action issued in related U.S. Appl. No. 16/772,703, dated Jul. 21, 2021 (6 pgs).
Official Action issued in related U.S. Appl. No. 16/961,620, dated Aug. 5, 2021 (7 pgs).
Official Action issued in related U.S. Appl. No. 17/293,435, dated Nov. 23, 2021 (12 pgs).
Official Action issued in related U.S. Appl. No. 17/293,435, dated May 31, 2022 (11 pgs).
Official Action issued in related U.S. Appl. No. 16/961,627, dated Oct. 26, 2021 (24 pgs).
Notice of Allowance issued in related U.S. Appl. No. 16/957,340, dated May 24. 2022 (16 pgs).
Notice of Allowance issued in related U.S. Appl. No. 16/961,627, dated May 5, 2022 (19 pgs).
Official Action issued in related U.S. Appl. No. 16/957,344, dated Mar. 29, 2022 (19 pgs).
Official Action issued in related U.S. Appl. No. 16/763,800, dated Jun. 8, 2022 (9 pgs).
Official Action issued in related U.S. Appl. No. 16/480,281, dated Jun. 8, 2022 (15 pgs).
Official Action issued in related U.S. Appl. No. 16/766,096, dated May 27, 2022 (7 pgs).
Official Action issued in related U.S. Appl. No. 16/771,548, dated Dec. 8, 2021 (15 pgs).
Alicia Action issued in related U.S. Appl. No. 16/771,548, dated Jun. 7, 2022 (11 pgs).

(56) References Cited

OTHER PUBLICATIONS

Official Action issued in related U.S. Appl. No. 16/483,621, dated Jun. 17, 2022 (13 pgs).

* cited by examiner

CAPACITY CONTROL VALVE AND CONTROL METHOD FOR CAPACITY CONTROL VALVE

CROSS-REFERENCE TO RELATED APPLICATIONS

This application is the U.S. National Phase under 35 U.S.C. § 371 of International Application PCT/JP2018/043652, filed Nov. 28, 2018, which claims priority to Japanese Patent Application No. 2017-231303, filed Nov. 30, 2017. The International Application was published under PCT Article 21(2) in a language other than English.

TECHNICAL FIELD

The present invention relates to a capacity control valve used for controlling a flow rate or pressure of a variable capacity compressor, and a method for controlling the same.

BACKGROUND ART

As a variable capacity compressor, for example, a swash plate type variable capacity compressor used for an air-conditioning system for motor vehicle and the like includes a rotating shaft rotationally driven by the rotational force of an engine, a swash plate which is coupled to the rotating shaft so that its inclination angle may be varied, a piston for compression coupled to the swash plate, and the like, and changes the inclination angle of the swash plate, thereby changing a stroke of the piston and controlling a discharge rate of a refrigerant.

By appropriately controlling pressure within a control chamber and adjusting a balancing state of the pressure acting on the both surfaces of the piston by means of a capacity control valve which is driven to be opened or closed by electromagnetic force while utilizing a suction pressure of a suction chamber for suctioning a refrigerant, a discharge pressure of a discharge chamber for discharging the refrigerant pressurized by the piston, and a control chamber pressure of the control chamber (a crank chamber) containing the swash plate, the inclination angle of the swash plate can be continuously changed.

An example of such a capacity control valve is shown in FIG. 6. A capacity control valve 160 includes: a valve section 170 having a second valve chamber 182 communicating with a discharge chamber of a compressor via a second communication passage 173, a first valve chamber 183 communicating with a suction chamber via a first communication passage 171, and a third valve chamber 184 communicating with a control chamber via a third communication passage 174; a pressure-sensitive body 178 which is arranged in the third valve chamber to extend and contract by ambient pressure and which has a valve seat body 180 provided at a free end in an extension and contraction direction; a valve body 181 having a second valve part 176 for opening and closing a valve hole 177 for communicating the second valve chamber 182 and the third valve chamber 184, a first valve part 175 for opening and closing the first communication passage 171 and a circulation groove 172, and a third valve part 179 for opening and closing the third valve chamber 184 and the circulation groove 172 by engagement and disengagement to and from the valve seat body 180 in the third valve chamber 184; a solenoid section 190 for exerting an electromagnetic driving force on the valve body 181, and the like.

Then, in the control capacity valve 160, without providing a clutch mechanism in a variable capacity compressor, a pressure in the control chamber (a control chamber pressure) Pc and a suction pressure Ps (a suction pressure) can be adjusted by communicating the discharge chamber and the control chamber in a case where the need to change the control chamber pressure arises (Hereinafter, it is referred to as a "conventional art". For example, see Patent Document 1.).

CITATION LIST

Patent Document

Patent Document 1: JP 5167121 B

SUMMARY OF THE INVENTION

Problem to be Solved by the Invention

In the conventional art, if the swash plate type variable capacity compressor is stopped for a long time, a liquid refrigerant (the refrigerant which is liquefied by being cooled during standing) is accumulated in the control chamber (crank chamber), and therefore a set discharge rate cannot be secured even if the compressor is started in this state. Therefore, in order to perform a desired capacity control just after start-up, the liquid refrigerant in the control chamber (crank chamber) needs to be discharged as quickly as possible.

Thus, as shown in FIG. 7, the conventional capacity control valve 160 includes a liquid refrigerant discharge function in order to discharge the liquid refrigerant in the control chamber (crank chamber) as quickly as possible at the time of start-up. That is, if the swash plate type variable capacity compressor is stopped and then is intended to be started after a long-time standing, high-pressure liquid refrigerant accumulated in the control chamber (crank chamber) flows into the third valve chamber 184 from the third communication passage 174. Then, the pressure-sensitive body (bellows) 178 contracts and the third valve part 179 and the valve seat body 180 are opened therebetween, and the liquid refrigerant is discharged to the discharge chamber via the suction chamber out of the control chamber (crank chamber) through the auxiliary communication passage 185, a communication passage 186 and the circulation groove 172 from the third valve chamber 184 and is vaporized rapidly, thereby capable of achieving a cooling operation state in a short time.

However, in the above-described conventional art, in the early liquid refrigerant discharge process, the opening of the third valve part 179 is large because the pressure of the control chamber is high, and it is possible to efficiently discharge the liquid refrigerant. However, the opening of the third valve part is reduced as discharge of the liquid refrigerant is advanced and the pressure of the control chamber is reduced, and therefore there was a problem that it takes time to discharge the liquid refrigerant.

Moreover, conventionally, in a liquid refrigerant discharge operation, attention has been paid to how to complete discharge of a liquid refrigerant in a short time, and therefore control for reducing the engine load in the liquid refrigerant discharge operation hasn't been performed. However, if the liquid refrigerant discharge operation is performed when the engine load is high, the engine load is further increased, and there was also a problem that energy efficiency of the entire motor vehicle may be reduced.

The present invention has been made to solve the problem the above-described conventional art has, and an object thereof is to provide, in a capacity control valve for controlling a flow rate or pressure of a variable capacity compressor according to a valve opening of a valve section, the capacity control valve which can efficiently discharge a liquid refrigerant irrespective of the pressure of a suction chamber and shift to a cooling operation in a short time and which can reduce the drive power of a compressor in a liquid refrigerant discharge operation, and a method for controlling the capacity control valve.

Means for Solving Problem

To attain the above object, a capacity control valve according to a first aspect of the present invention is a capacity control valve for controlling a flow rate or pressure of a variable capacity compressor according to a valve opening of a valve section, and the capacity control valve includes:

a valve main body having a first communication passage through which a fluid at a first pressure passes, a second communication passage which is arranged adjacent to the first communication passage and through which a fluid at a second pressure passes, a third communication passage which is arranged adjacent to the second communication passage and through which a fluid at a third pressure passes, and a main valve seat arranged in a valve hole for communicating the second communication passage and the third communication passage;

a solenoid which drives a rod having an auxiliary valve seat;

a valve body having an intermediate communication passage for communicating the first communication passage and the third communication passage, a main valve part for opening and closing the valve hole by separating from and contacting the main valve seat, and an auxiliary valve part for opening and closing the intermediate communication passage by separating from and contacting the auxiliary valve seat;

a first biasing member which biases the main valve part in a valve closing direction thereof; and a second biasing member which biases the main valve part in a valve opening direction thereof, and is characterized in that the rod relatively moves to the valve body, and opens and closes the auxiliary valve part.

According to the first aspect, it is possible to open and close the auxiliary valve part by relatively moving the rod to the valve body, and therefore it is possible to maintain the opening of the auxiliary valve part at a fully open state from the start of discharge of liquid refrigerant to the completion of discharge of liquid refrigerant, thereby capable of efficiently discharging the liquid refrigerant.

The capacity control valve according to a second aspect of the present invention is characterized in that the first biasing member is arranged between the rod and the valve body.

According to the second aspect, it is possible to transmit the drive power of the solenoid to the valve closing direction of the main valve part via the first biasing member arranged between the rod and the valve body and surely close the main valve part.

The capacity control valve according to a third aspect of the present invention is characterized in that the first biasing member is arranged between the solenoid and the valve body.

According to the third aspect, it is possible to bias the valve body in the valve closing direction of the main valve part by the first biasing member arranged between the solenoid and the valve body.

The capacity control valve according to a fourth aspect of the present invention is characterized in that:

the solenoid further includes a plunger connected to the rod, a core arranged between the plunger and the valve main body, and an electromagnetic coil; and the second biasing member is arranged between the plunger and the core.

According to the fourth aspect, it is possible to surely bias the valve body in the valve opening direction of the main valve part by the second biasing member arranged between the plunger and the core.

The capacity control valve according to a fifth aspect or a sixth aspect of the present invention is characterized in that:

the first pressure is a suction pressure of the variable capacity compressor, the second pressure is a discharge pressure of the variable capacity compressor, and the third pressure is a pressure of a crank chamber of the variable capacity compressor; or the first pressure is the pressure of the crank chamber of the variable capacity compressor, the second pressure is the discharge pressure of the variable capacity compressor, and the third pressure is the suction pressure of the variable capacity compressor.

According to the fifth aspect and the sixth aspect, the capacity control valve can correspond to various variable capacity compressors.

To attain the above object, a method for controlling the capacity control valve according to a seventh aspect of the present invention is characterized in that when the auxiliary valve part is in an open state, the main valve part is made into an open state from a closed state.

According to the seventh aspect, by opening the main valve part in a state that the biasing force of the pressure-sensitive body does not act on the valve body at the time of discharge of liquid refrigerant, it is possible to increase the flow rate from a discharge chamber to a control chamber and reduce the load of the compressor.

DESCRIPTION OF EMBODIMENTS

Figure 1:
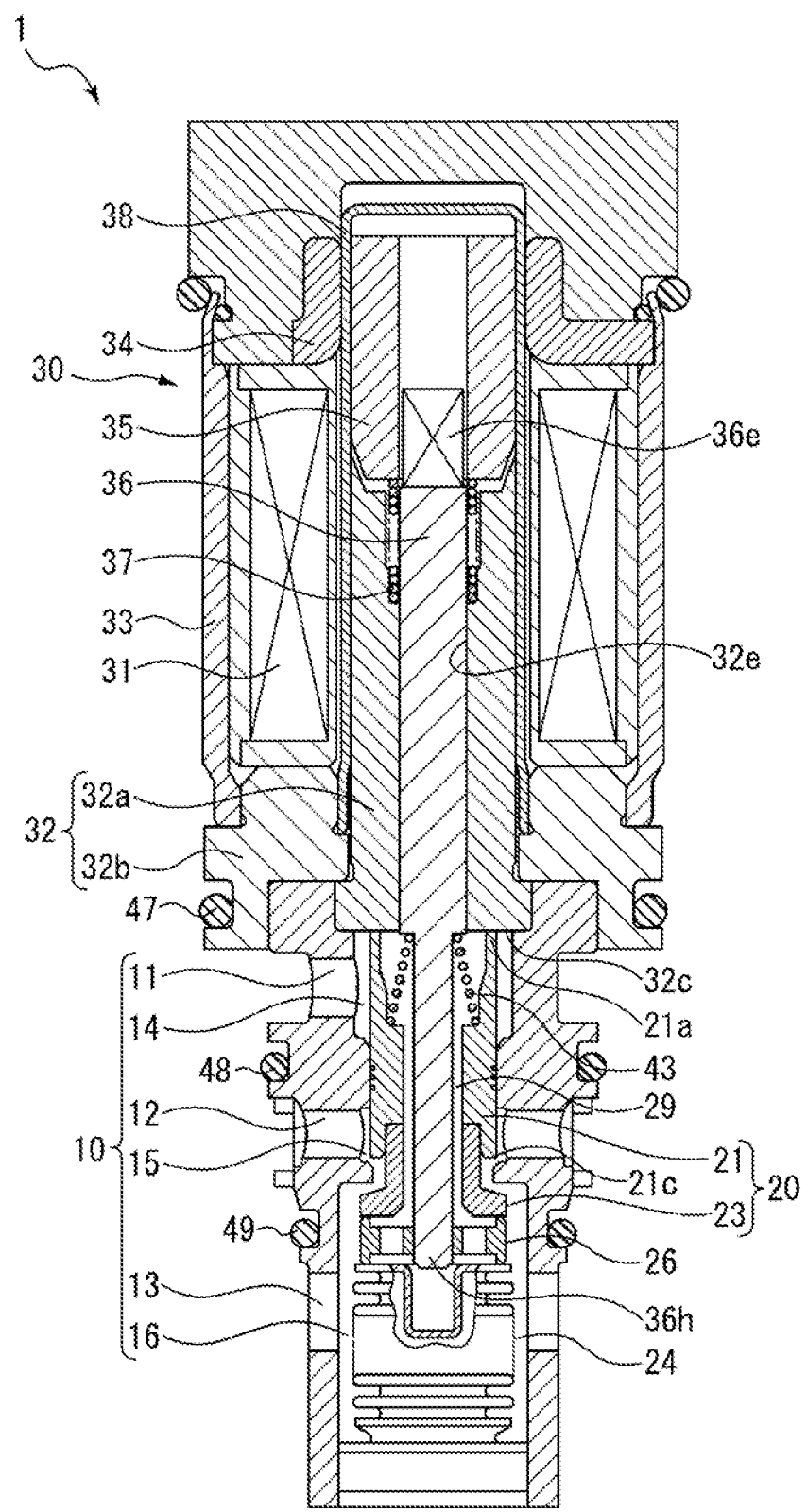
FIG. 1 is a front cross-sectional view of a capacity control valve according to the present invention.

Hereinafter referring to the drawings, modes for carrying out the present invention will be described illustratively based on an embodiment. However, the dimensions, materials, shapes, relative arrangements, and others of components described in the embodiment are not intended to limit the scope of the present invention only to them unless otherwise described explicitly.

Referring to FIG. 1 to FIG. 4, a capacity control valve according to the present invention will be described. In FIG. 1, 1 denotes a capacity control valve. The capacity control valve 1 mainly consists of a valve main body 10, a valve body 20, a pressure-sensitive body 24, and a solenoid 30.

Figure 2:
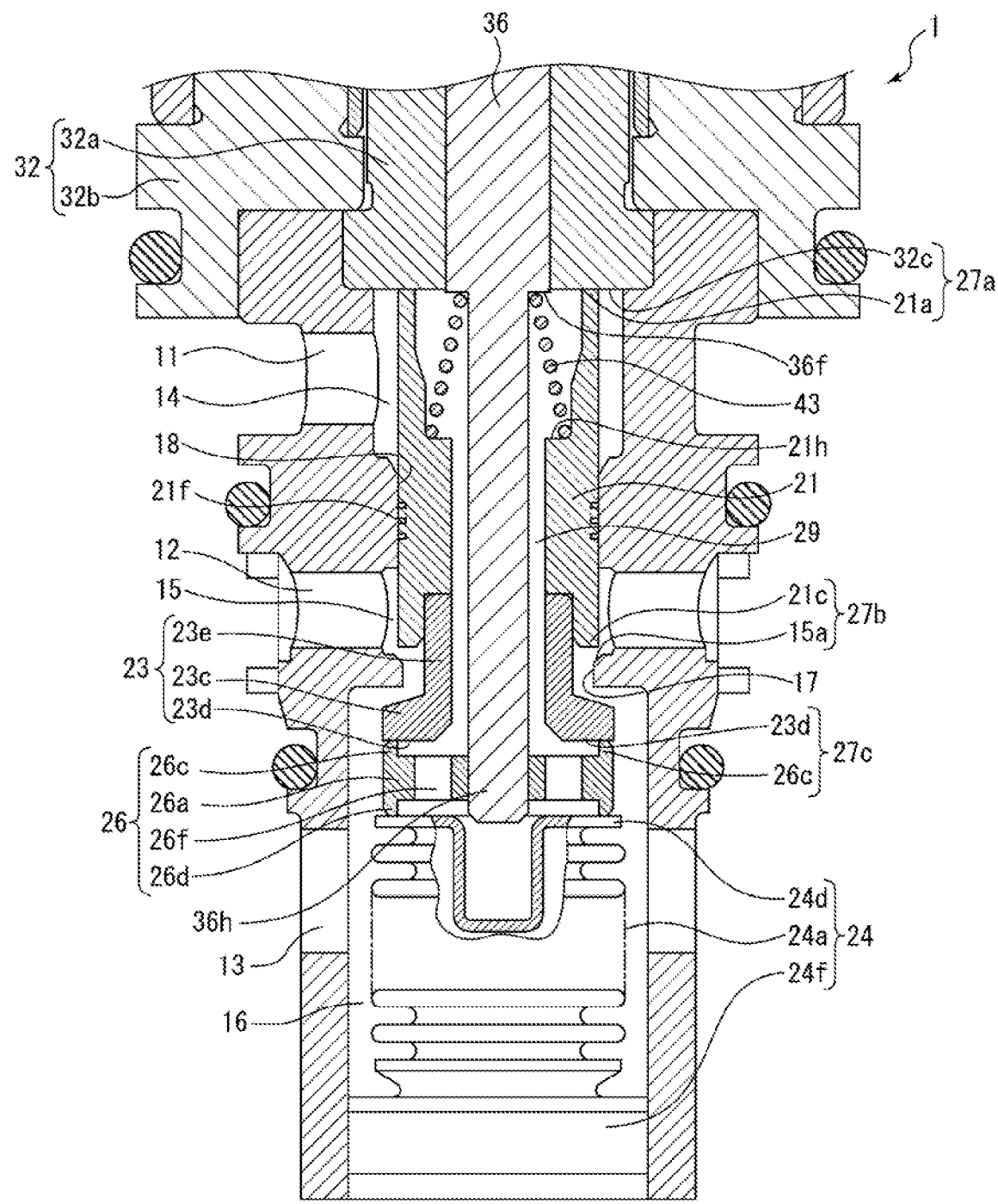
FIG. 2 is a partially enlarged view of a valve main body, a valve body and a solenoid of FIG. 1, and shows the capacity control valve when the solenoid is OFF.

Hereinafter, each component of the capacity control valve 1 will be described with reference to FIG. 1 and FIG. 2. The valve main body 10 is composed of a metal such as brass, iron, aluminum, or stainless steel, a synthetic resin material, or the like. The valve main body 10 is a hollow cylindrical member having a through hole penetrating in an axial direction, and in a compartment of the through hole, a first valve chamber 14, a second valve chamber 15 adjacent to the first valve chamber 14, and a third valve chamber 16 adjacent to the second valve chamber 15 are sequentially arranged.

To the second valve chamber 15, a second communication passage 12 is consecutively provided. The second communication passage 12 is configured to communicate with a discharge chamber (not shown) of a variable capacity compressor such that a fluid at a discharge pressure Pd (a second pressure according to the present invention) can flow into the third valve chamber 16 from the second valve chamber 15 by opening and closing of the capacity control valve 1.

To the third valve chamber 16, a third communication passage 13 is consecutively provided. The third communication passage 13 is communicated with a control chamber (not shown) of the variable capacity compressor, and allows the fluid at the discharge pressure Pd flowed into the third valve chamber 16 from the second valve chamber 15 by opening and closing of the capacity control valve 1 to flow out to the control chamber (crank chamber) of the variable capacity compressor and allows the fluid at a control chamber pressure Pc (a third pressure according to the present invention) flowed into the third valve chamber 16 to flow out to a suction chamber of the variable capacity compressor through the first valve chamber 14 via an intermediate communication passage 29 described later.

Further, in the first valve chamber 14, a first communication passage 11 is consecutively provided. The first communication passage 11 guides the fluid at a suction pressure Ps (a first pressure according to the present invention) from the suction chamber of the variable capacity compressor to the pressure-sensitive body 24 via the intermediate communication passage 29 described later, and controls the suction pressure of the compressor to a set value.

Between the first valve chamber 14 and the second valve chamber 15, a hole part 18 having a smaller diameter than the diameters of these chambers is consecutively formed, the hole part 18 slides with a labyrinth 21$f$ described later, and a seal part which seals between the first valve chamber 14 and the second valve chamber 15 is formed. Moreover, between the second valve chamber 15 and the third valve chamber 16, a valve hole 17 having a smaller diameter than the diameters of these chambers is consecutively provided, and around the valve hole 17 on the second valve chamber 15 side, a main valve seat 15$a$ is formed. The main valve seat 15$a$ controls opening/closing of communication between the second valve chamber 15 and the third valve chamber 16 by separating from and contacting a main valve part 21$c$ described later.

In the third valve chamber 16, the pressure-sensitive body 24 is arranged. In the pressure-sensitive body 24, one end part of a metallic bellows 24$a$ is sealingly coupled to a partition adjustment part 24$f$. This bellows 24$a$ is manufactured by phosphor bronze, stainless, or the like, and is designed such that its spring constant is a predetermined value. An interior space of the pressure-sensitive body 24 is a vacuum or air exists therein. Then, the pressure acts to an effective pressure receiving area of the bellows 24$a$ of the pressure-sensitive body 24, and actuates the pressure-sensitive body 24 to be extended and contracted. On a free end part side of the pressure-sensitive body 24, a flange part 24$d$ is arranged. The flange part 24$b$ is directly pressed by a locking part 26 of a rod 36 described later, and thereby the pressure-sensitive body 24 extends and contracts. That is, as will be described later, the pressure-sensitive body 24 extends and contracts according to the suction pressure Ps guided to the pressure-sensitive body 24 via the intermediate communication passage 29 and extends and contracts by the pressing force of the rod 36.

The partition adjustment part 24$f$ of the pressure-sensitive body 24 is sealingly fitted and fixed so as to block the third valve chamber 16 of the valve main body 10. In addition, if the partition adjustment part 24$f$ is screwed, or fixed by a set screw (not shown), spring force of compression springs arranged in parallel within the bellows 24$a$ or of the bellows 24$a$ can be adjusted to be moved in the axial direction.

In addition, the first communication passage 11, the second communication passage 12, and the third communication passage 13 penetrate through a peripheral surface of the valve main body 10 respectively, for example, at two equal intervals to six equal intervals. Further, on an outer peripheral surface of the valve main body 10, mounting grooves for O rings are provided at three positions apart from each other in the axial direction. Then, to the respective mounting grooves, O rings 47, 48, 49 to seal between the valve main body 10 and a mounting hole (not shown) of a casing to which the valve main body 10 is fitted is mounted, and each of the first communication passage 11, the second communication passage 12, and the third communication passage 13 is configured as an independent flow passage.

Next, the valve body 20 will be described. The valve body 20 consists of the main valve body 21 and the adapter 23 which are made of hollow cylindrical members. Firstly, the main valve body 21 will be described. The main valve body 21 is a hollow cylindrical member, and in a nearly central part in the axial direction of an outer peripheral part thereof, the labyrinth 21$f$ is formed. The labyrinth 21$f$ slides with the hole part 18 between the first valve chamber 14 side and the second valve chamber 15 side and forms the seal part which seals the first valve chamber 14 and the second valve chamber 15. Thereby, the first valve chamber 14 and the second valve chamber 15 are configured as independent valve chambers.

The main valve body 21 is inserted in the valve main body 10, and the main valve body 21 is arranged across the labyrinth 21$f$ on the first communication passage 11 side at one end thereof and on the second communication passage 12 side at the other end thereof. At the end part of the main valve body 21 arranged on the second communication passage 12 side, a main valve part 21$c$ is formed, and the main valve part 21$c$ controls opening/closing of the valve hole 17 for communicating the second valve chamber 15 and the third valve chamber 16 by separating from and contacting the main valve seat 15$a$. The main valve part 21$c$ and the main valve seat 15$a$ constitute a main valve 27$b$. Here, the state that the main valve part 21$c$ and the main valve seat 15$a$ shift from a contact state to a separated state means that the main valve 27b is opened or the main valve part 21c is opened, and the state that the main valve part 21c and the main valve seat 15a shift from the separated state to the contact state means that the main valve 27b is closed or the main valve part 21c is closed. Moreover, at the end part of the main valve body 21 arranged on the first communication passage 11 side, a shutoff valve part 21a is formed. The shutoff valve part 21a contacts an end part 32c of a core 32 when the solenoid 30 described later is OFF, and shuts off communication between the intermediate communication passage 29 and the first valve chamber 14. The shutoff valve part 21a and the end part 32c of the core 32 constitute a shutoff valve 27a. The shutoff valve part 21a and the main valve part 21b of the valve body 20 are formed so as to be opened and closed oppositely to each other. In addition, the state that the shutoff valve part 21a and the end part 32c of the core 32 shift from the contact state to the separated state means that the shutoff valve 27a is opened or the shutoff valve part 21a is opened, and the state that the shutoff valve part 21a and the end part 32c of the core 32 shift from the separated state to the contact state means that the shutoff valve 27a is closed or the shutoff valve part 21a is closed.

Secondly, the adapter 23 constituting the valve body 20 will be described. The adapter 23 is a hollow cylindrical member, and mainly consists of a large diameter part 23c formed to have a large diameter, and a tube part 23e formed to have a diameter smaller than that of the large diameter part 23c. The tube part 23e is fitted to an open end part on the main valve part 21c side of the main valve body 21, thereby constituting the valve body 20. Thereby, in an interior of the main valve body 21 and the adapter 23, that is, in an interior of the valve body 20, the intermediate communication passage 29 penetrating in the axial direction is formed. Moreover, at the large diameter part 23c of the adapter 23, an auxiliary valve part 23d is formed, and the auxiliary valve part 23d contacts and separates from an auxiliary valve seat 26c of the locking part 26 of the rod 36, and opens and closes communication between the third valve chamber 16 and the intermediate communication passage 29. The auxiliary valve part 23d and the auxiliary valve seat 26c constitute an auxiliary valve 27c. In addition, the state that the auxiliary valve part 23d and the auxiliary valve seat 26c shift from the contact state to the separated state means that the auxiliary valve 27c is opened or the auxiliary valve part 23d is opened, and the state that the auxiliary valve part 23d and the auxiliary valve seat 26c shift from the separated state to the contact state means that the auxiliary valve 27c is closed or the auxiliary valve part 23d is closed.

Next, the solenoid 30 will be described. The solenoid 30 includes the rod 36, a plunger case 38, an electromagnetic coil 31, the core 32 consisting of a center post 32a and a base member 32b, a plunger 35, a plate 34, and a solenoid case 33, and the electromagnetic coil 31 is supplied with power from the outside, thereby driving the rod 36. The plunger case 38 is a bottomed hollow cylindrical member whose one end is opened. The plunger 35 is arranged axially movably with respect to the plunger case 38 between the plunger case 38 and the center post 32a arranged in an interior of the plunger case 38. The core 32 is fitted to the valve main body 10, and is arranged between the plunger 35 and the valve main body 10. The rod 36 is arranged to penetrate the center post 32a of the core 32 and the valve body 20 arranged in the valve main body 10, and the rod 36 has a gap with a through hole 32e of the center post 32a of the core 32 and the intermediate communication passage 29 of the valve body 20 and can relatively move to the core 32 and the valve body 20. Then, one end part 36e of the rod 36 is connected to the plunger 35, and to a pressing part 36h at the other end part, the locking part 26 is connected.

Here, the locking part 26 constituting a part of the rod 36 will be described. The locking part 26 is a disk-shaped member, and is formed with a base part 26a and collar parts on both sides of the base part 26a in the axial direction. One of the collar parts functions as the auxiliary valve seat 26c which separates from and contacts the auxiliary valve part 23d of the adapter 23, and the other functions as a pressing part 26d which separates from and contacts the flange part 24d of the pressure-sensitive body 24 and allows the pressure-sensitive body 24 to extend and contract. Moreover, in the base part 26a of the locking part 26, a circulation hole 26f through which a refrigerant circulates is formed. In addition, the locking part 26 may be configured integrally with the rod 26, or the locking part 26 may be fitted and fixed to the rod 36 as one body.

Moreover, between the core 32 and the plunger 35, a spring 37 (a second biasing member according to the present invention) which biases the plunger 35 so that it separates from the core 32 is arranged. Thereby, the biasing force of the spring 37 acts in the direction in which the main valve part 21c of the valve body 20 is opened.

Moreover, to an inner peripheral part of the base member 32b of the core 32, an open end part of the plunger case 38 is sealingly fixed, and to an outer peripheral part of the base member 32b, the solenoid case 33 is sealingly fixed. Then, the electromagnetic coil 31 is arranged in a space surrounded by the plunger case 38, the base member 32b of the core 32 and the solenoid case 33, and does not contact the refrigerant, therefore it is possible to prevent reduction in insulation resistance.

Next, a spring 43 (a first biasing member according to the present invention) will be described. The spring 43 formed into a truncated cone is arranged between the solenoid 30 and the valve body 20. Concretely, one end of the spring 43 contacts a stepped part 36f of the rod 36 which is formed at almost the same position as the end part 32c of the core 32, and the other end thereof contacts an inner stepped part 21h formed on the intermediate communication passage 29 side of the valve body 20. Thereby, the size of the biasing force of the spring 43 is increased and decreased according to the movement of the rod 36, and the biasing force of the spring 43 acts in the direction in which the main valve part 21c of the valve body 20 is closed.

The operation of the capacity control valve 1 having the configuration described above will be described. In addition, the flow passage leading to the first communication passage 11 through the intermediate communication passage 29 from the third communication passage 13 is hereinafter described as a "Pc-Ps flow passage". Moreover, a flow passage leading to the third communication passage 13 through the valve hole 17 from the second communication passage 12 is hereinafter described as a "Pd-Pc flow passage".

Firstly, the movement of the rod 36 and the movement of each valve part of the valve body 20 will be described. At first, in a non-energized state of the solenoid 30, the resultant force of the biasing force of the pressure-sensitive body 24 and the biasing force of the spring 37 (FIG. 1) exceeds the biasing force of the spring 43 as shown in FIG. 2, and therefore the rod 36 is pushed up, the adapter 23 which contacts the locking part 26 of the rod 36 is pressed upward and the main valve part 21c is fully opened, and the shutoff valve part 21a contacts the end part 32c of the core 32 and the shutoff valve part 21a is fully closed.

Figure 3:
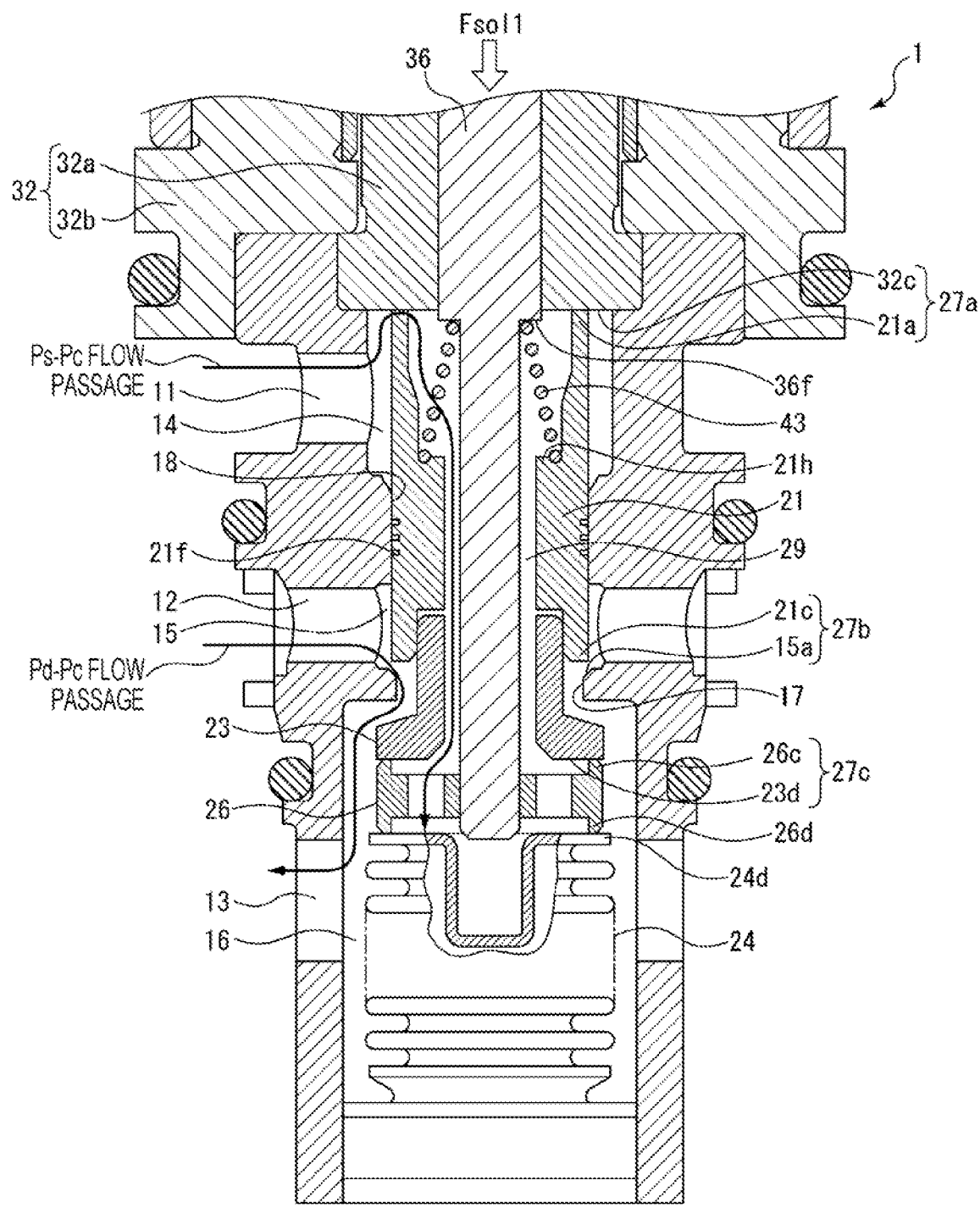
FIG. 3 is a partially enlarged view of the valve main body, the valve body and the solenoid of FIG. 1, and shows a control state of the capacity control valve.

Next, as shown in FIG. 3, when the solenoid 30 begins to be energized from the non-energized state, the rod 36 is gradually driven in an advancing direction (a direction in which the rod 36 protrudes outside from the end part 32c of the core 32). At this time, the valve body 20 is pressed downward of FIG. 3 by the spring 43, and therefore the adapter 23 of the valve body 20 moves in a state that it contacts the locking part 26 of the rod 36, and the rod 36 and the valve body 20 move integrally. Thereby, the shutoff valve part 21a is separated from the end part 32c of the core 32, the shutoff valve 27a is opened from the fully closed state, and the main valve 27b is gradually narrowed from the fully open state.

Figure 4:
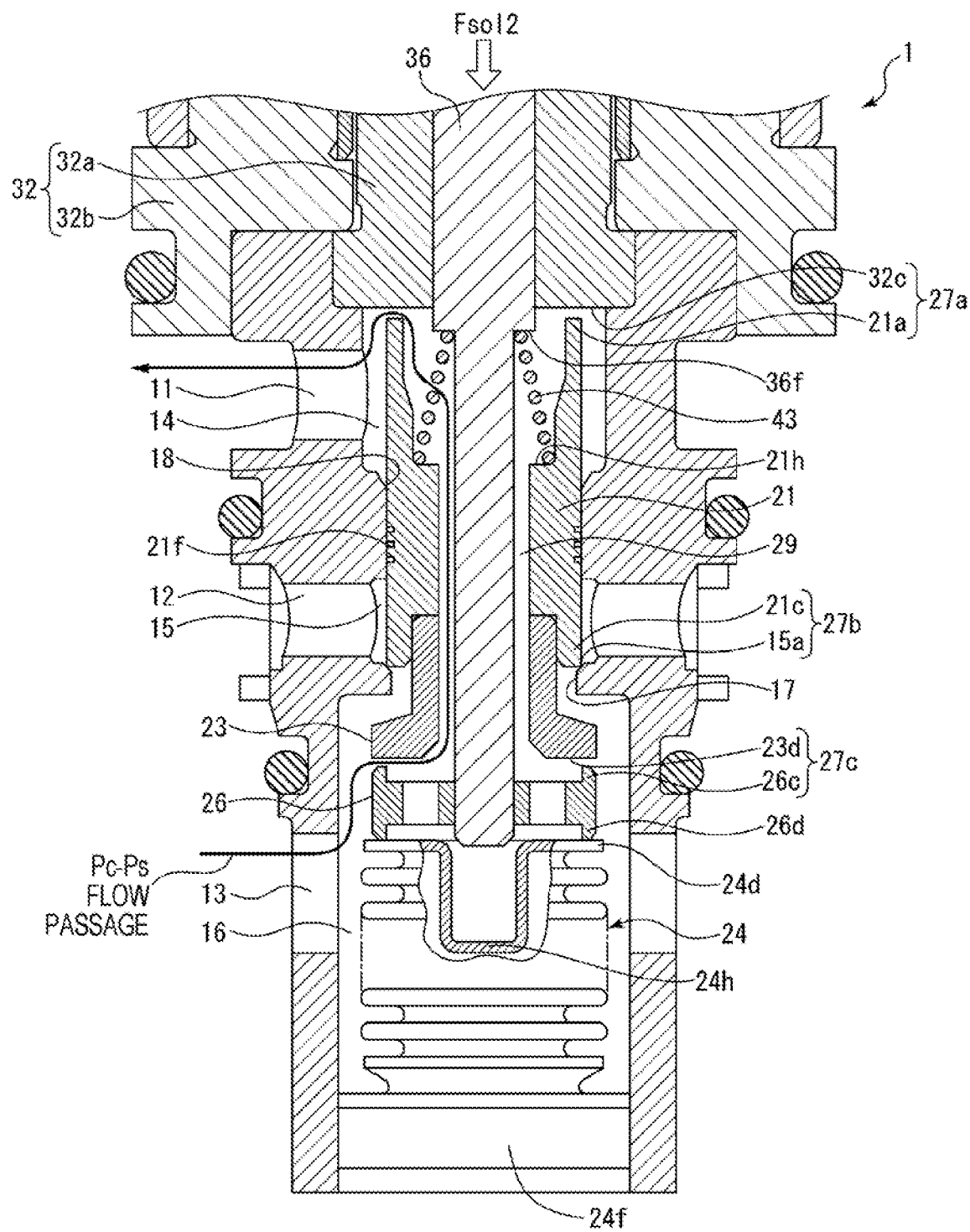
FIG. 4 is a partially enlarged view of the valve main body, the valve body and the solenoid of FIG. 1, and shows a state that the capacity control valve discharges a liquid refrigerant.

If the rod 36 is further driven in the advancing direction, the shutoff valve 27a is fully opened as shown in FIG. 4, the main valve part 21c contacts the main valve seat 15a and the main valve 27b is fully closed, and the movement of the valve body 20 is stopped. If the rod 36 is further driven in the advancing direction from this state, the rod 36 relatively moves to the valve body 20, the auxiliary valve seat 26c of the locking part 26 is separated from the auxiliary valve part 23d of the adapter 23, and the auxiliary valve 27c is opened. If the rod 36 is further driven, the pressing part 26d of the locking part 26 presses the flange part 24d and contracts the pressure-sensitive body 24, and thereby the auxiliary valve 27c can be made into the fully open state. Then, when the pressure-sensitive body 24 contracts by a prescribed amount, a convex part 24h of the flange part 24d and a convex part (not shown) provided at the partition adjustment part 24f contact and deformation of the pressure-sensitive body 24 stops, and movement of the rod 36 also stops.

Next, a control state of the capacity control valve 1 will be described based on FIG. 3. The control state is a state that: the auxiliary valve 27c is closed, the opening of the main valve 27b is set to a predetermined certain opening, and the pressure of the suction chamber of the variable capacity compressor is controlled so as to be a set value Pset. In this state, the fluid at the suction pressure Ps flowed to the first valve chamber 14 through the first communication passage 11 from the suction chamber of the variable capacity compressor acts on the pressure-sensitive body 24 through the intermediate communication passage 29. As a result, the main valve part 21c stops at a position where the force by the spring 43 in a valve closing direction of the main valve part 21c, the force by the spring 37 in a valve opening direction of the main valve part 21c, the force by the solenoid 30, and the force by the pressure-sensitive body 24 which extends and contracts according to the suction pressure Ps are balanced, and the pressure of the suction chamber of the variable capacity compressor is controlled so as to be the set value Pset. However, even if the opening of the main valve 27b is set to the predetermined opening, the pressure Ps of the suction chamber may vary due to disturbance and the like with respect to the set value Pset. For example, when the pressure Ps of the suction chamber is increased than the set value Pset due to disturbance and the like, the pressure-sensitive body 24 contracts, and the opening of the main valve 27b is reduced. Thereby, the Pd-Pc flow passage is narrowed, and therefore the amount of the refrigerant at the discharge pressure Pd flowing into the crank chamber from the discharge chamber is reduced, and the pressure of the crank chamber is reduced, and consequently the inclination angle of the swash plate of the compressor is increased, the discharge capacity of the compressor is increased, and the discharge pressure is reduced. To the contrary, when the pressure Ps of the suction chamber is decreased than the set value Pset, the pressure-sensitive body 24 extends, and the opening of the main valve 27b is increased. Thereby, Pd-Pc flow passage is increased, and therefore the amount of the refrigerant at the discharge pressure Pd flowing into the crank chamber from the discharge chamber is increased, and the pressure of the crank chamber is increased, and consequently the inclination angle of the swash plate of the compressor is decreased, the discharge capacity is reduced, and the discharge pressure is increased. In this way, by the capacity control valve 1, the pressure of the suction chamber of the variable capacity compressor can be controlled so as to be the set value Pset.

Next, a liquid refrigerant discharge state of the capacity control valve 1 will be described based on FIG. 4. The liquid refrigerant (the refrigerant which is liquefied by being cooled during standing) is accumulated in the crank chamber after the compressor is stopped for a long time, and therefore in order to secure the predetermined discharge pressure and discharge flow rate after the compressor is started, the liquid refrigerant needs to be discharged as quickly as possible. At the time of the liquid refrigerant discharge, the pressure of the third valve chamber 16 communicating with the crank chamber becomes high pressure, and the suction pressure Ps also becomes high pressure. Thereby, the pressure-sensitive body 24 contracts and the valve body 20 is pressed downward by the spring 43, and therefore the main valve 27b is closed, and the auxiliary valve 27c is opened. Also in this state, it is possible to discharge the liquid refrigerant through the Pc-Ps flow passage from the crank chamber to the suction chamber. However, the pressure of the third valve chamber 16 and the suction pressure Ps are gradually reduced as discharge of the liquid refrigerant is advanced, and therefore the opening of the auxiliary valve 27c is gradually reduced, and it takes a long time to complete discharge of the liquid refrigerant. Then, the solenoid 30 is driven in the advancing direction and the pressure-sensitive body 24 is pressed by the locking part 26 of the rod 36, and the auxiliary valve 27c is forcibly made into the fully open state. Thereby, the auxiliary valve part 23d is maintained in the fully open state, and therefore it is possible to discharge the liquid refrigerant from the crank chamber via the Pc-Ps flow passage to the suction chamber in a short time without changing the opening of the auxiliary valve part 23d from the start of discharge of liquid refrigerant to the completion of discharge of liquid refrigerant.

In addition, conventionally, in a liquid refrigerant discharge operation, attention has been paid to how to complete discharge of a liquid refrigerant in a short time, and therefore the engine load was sometimes excessive in the liquid refrigerant discharge operation. On the other hand, when the liquid refrigerant is discharged by using the conventional capacity control valve, the auxiliary valve part 23d is opened, and the biasing force from the pressure-sensitive body 24 doesn't act on the valve body 20, and therefore there was also a circumstance where it is difficult to rapidly drive the valve body 20. The capacity control valve 1 according to the present invention can rapidly drive the valve body 20 even at the time of the liquid refrigerant discharge. In the liquid refrigerant discharge, the operation of the capacity control valve 1 at the time of reducing the engine load will be described.

In a case where the engine load is reduced in the liquid refrigerant discharge, the solenoid 30 is turned to OFF, and a magnetic attractive force Fsol between the core 32 and the plunger 35 is manipulated to zero. The upward pressure and the downward pressure which act on the valve body 20 are set to be canceled, and therefore in the main force acting on the valve body 20 in the liquid refrigerant discharge, the biasing force of the spring 37 which acts in the valve opening direction of the main valve 27b and the resultant force between the biasing force of the spring 43 which acts in the valve closing direction of the main valve 27b and the magnetic attractive force Fsol of the solenoid 30 are balanced. Here, if the magnetic attractive force Fsol of the solenoid 30 becomes zero, the biasing force of the spring 37 which acts in the valve opening direction of the main valve 27b becomes dominant and the rod 36 moves upward, and the spring 43 extends and the biasing force of the spring 43 which acts in the valve closing direction of the main valve 27b is reduced. As a result, the rod 36 is rapidly pushed up, the locking part 26 contacts the adapter 23 and the valve body 20 is driven in the valve opening direction of the main valve 27b, and the main valve 27b is rapidly fully opened. When the main valve 27b is fully opened, the amount of the refrigerant flowing into the crank chamber through the Pd-Pc flow passage from the discharge chamber of the compressor is increased, the pressure Pc of the crank chamber becomes high, and the compressor is operated at a minimum capacity. In this way, as in the liquid refrigerant discharge, even in a state that the auxiliary valve part 23d is opened and the force from the pressure-sensitive body 24 doesn't act on the valve body 20, it is possible to reduce the load of the compressor, and thus it is possible to reduce the engine load in the liquid refrigerant discharge.

Moreover, also in the case where the engine load is intended to be reduced in the control state by the capacity control valve 1 so that the pressure of the suction chamber of the compressor becomes the set value Pset, the solenoid 30 is made into a non-energized state as with the above, and thereby the main valve 27b is fully opened and the amount of the refrigerant at the pressure Pd flowing into the crank chamber through the Pd-Pc flow passage from the discharge chamber of the compressor is increased, and the compressor is operated at a minimum capacity, and thus it is possible to perform the operation for reducing the engine load.

In this way, the rod 36 moves integrally with the valve body 20 until the main valve 27b is fully closed from the fully open state, and after the main valve 27b is fully closed, the rod 36 relatively moves to the valve body 20, presses the pressure-sensitive body 24, and can open the auxiliary valve 27c. That is, one rod 36 can open and close different main valve part 21c and auxiliary valve part 23d. Moreover, as in the liquid refrigerant discharge, even in a state that the auxiliary valve 27c is opened and the force from the pressure-sensitive body 24 doesn't act on the valve body 20, the main valve 27b can be rapidly fully opened, and therefore in the open state of the Pd-Pc flow passage, the Pc-Ps flow passage can be opened and closed, and even in the closed state of the Pd-Pc flow passage, the Pc-Ps flow passage can be opened and closed.

Hereinbefore, although the embodiment of the present invention has been described by the drawings, its specific configuration is not limited to the embodiment, and any changes and additions made without departing from the scope of the present invention are included in the present invention.

Figure 5:
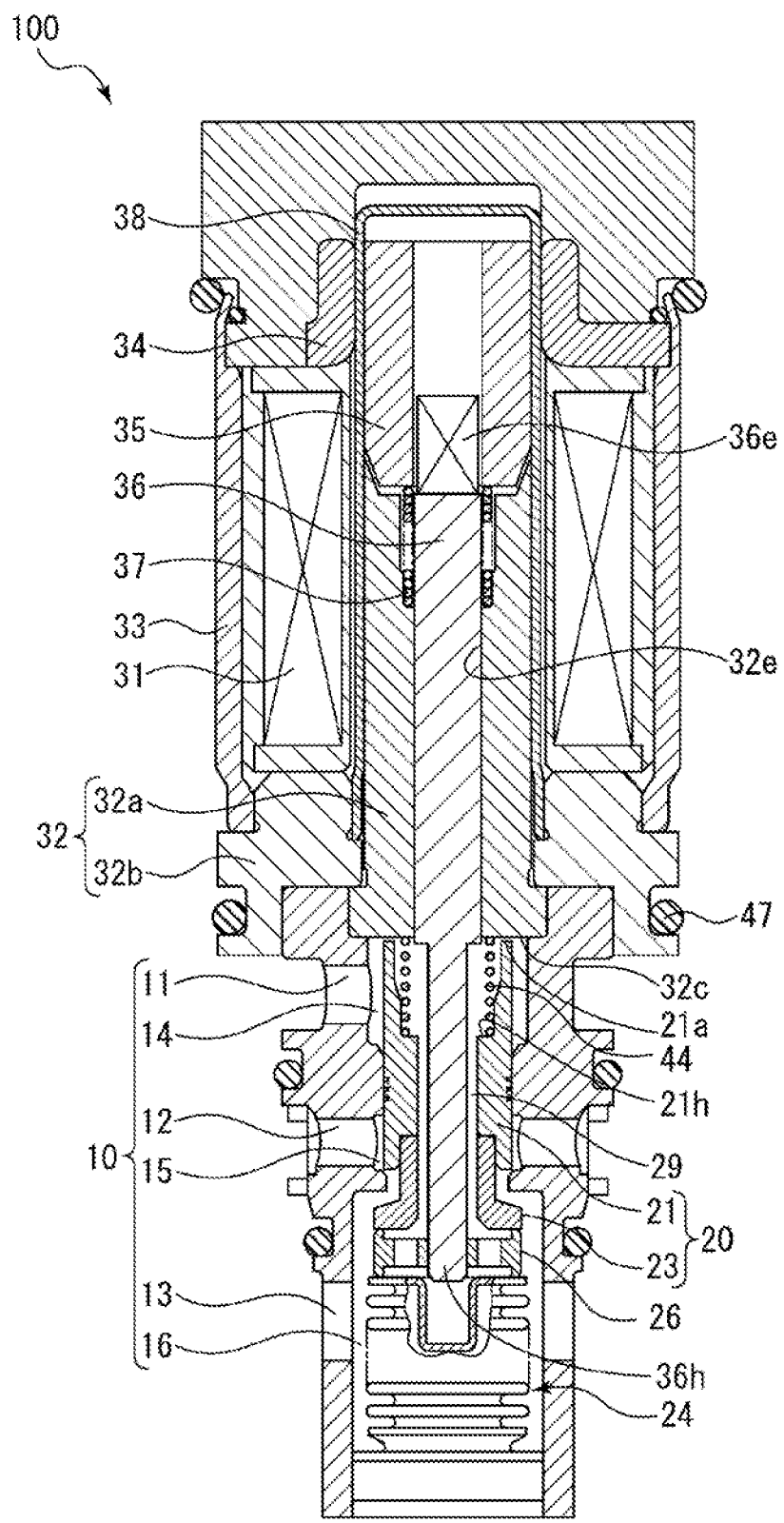
FIG. 5 is a front cross-sectional view of a modification of the capacity control valve according to the present invention.
Figure 6:
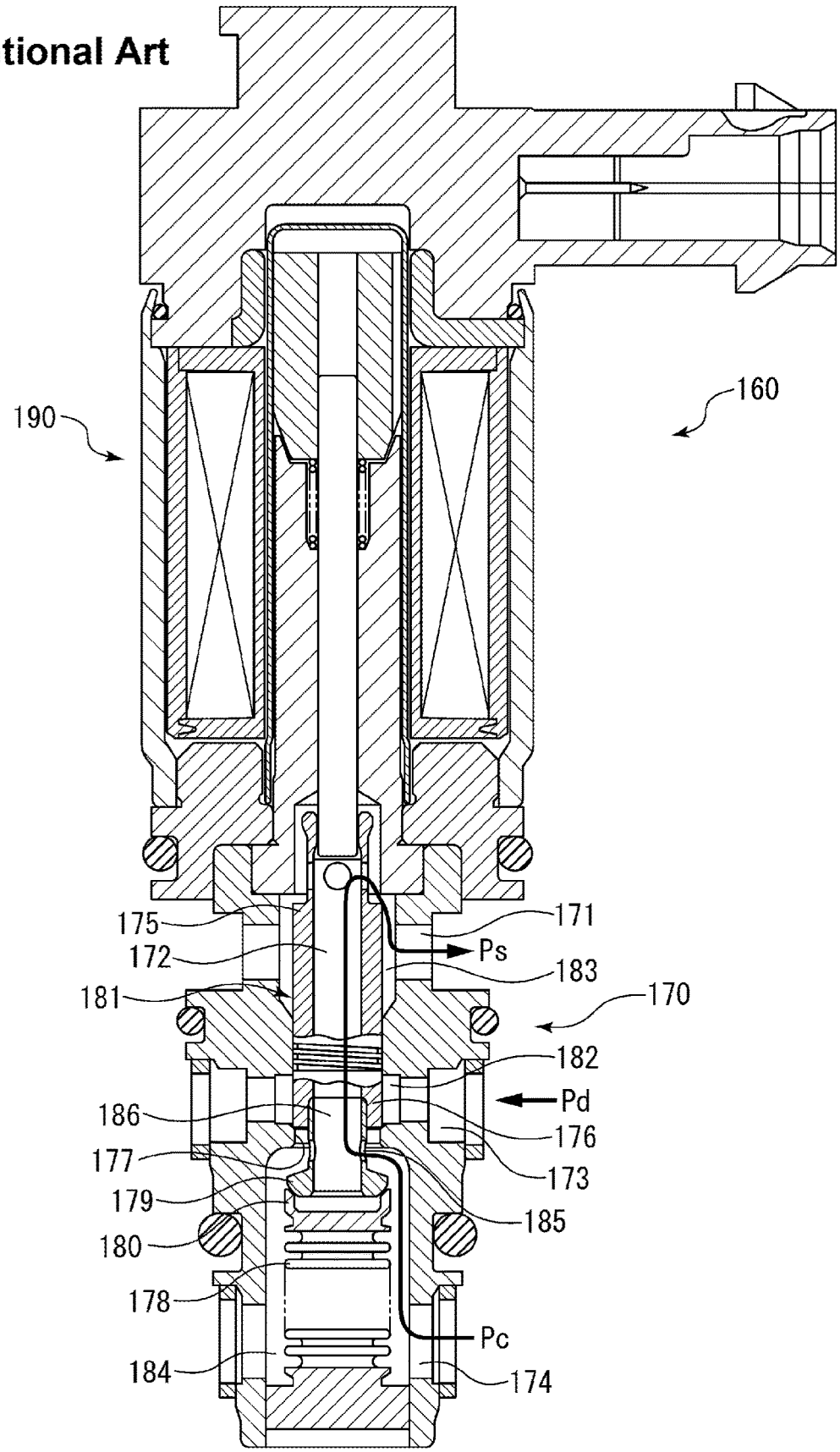
FIG. 6 is a front cross-sectional view showing the conventional capacity control valve.
Figure 7:
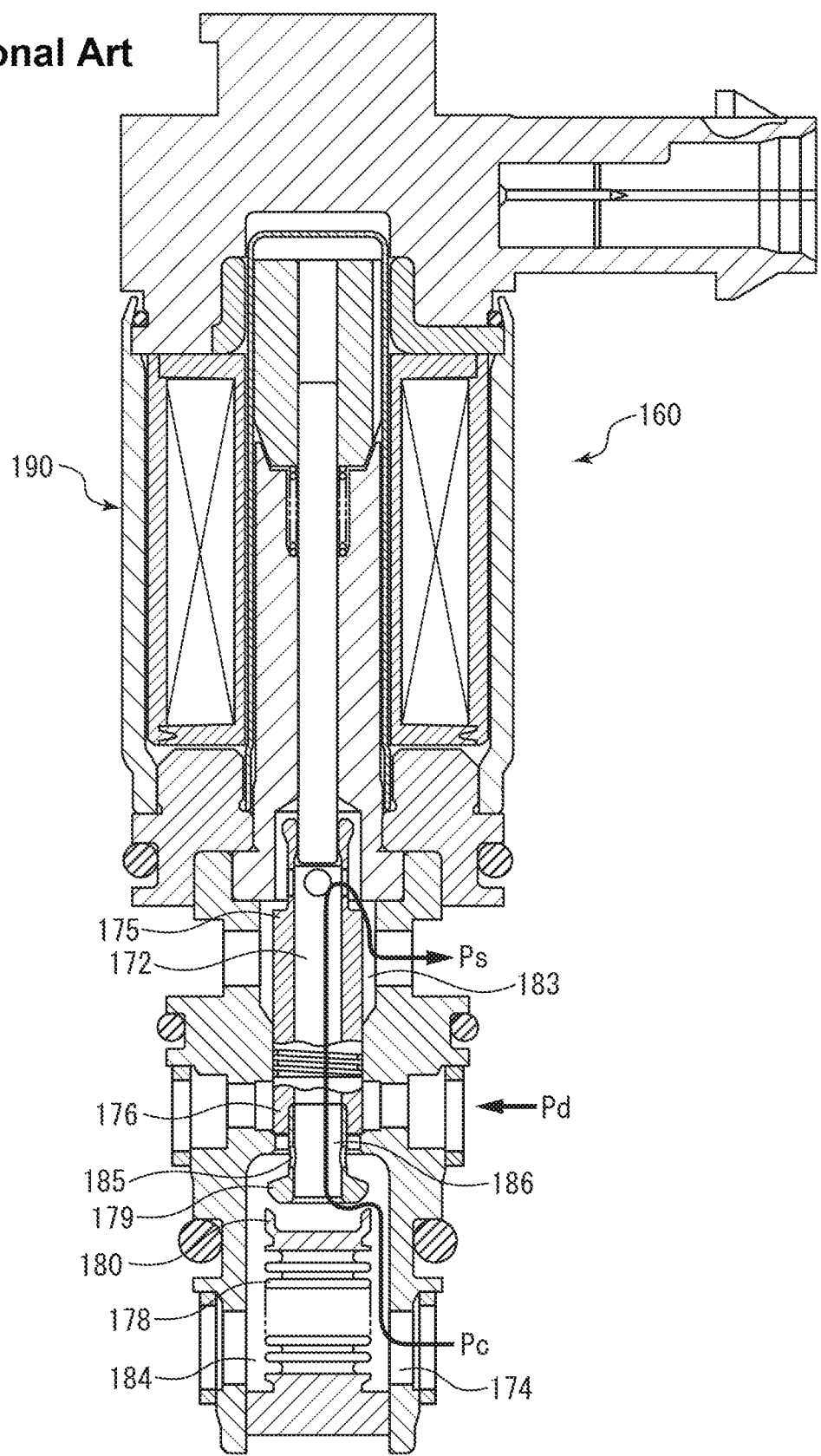
FIG. 7 is a diagram of the conventional capacity control valve, and shows a state that the capacity control valve discharges the liquid refrigerant.

For example, in the above embodiment, although one end of the spring 43 contacts the stepped part 36f of the rod 36 and the other end thereof contacts the inner stepped part 21h of the valve body 20, the present invention is not limited thereto. For example, as shown in FIG. 5, one end of the spring 44 may contact the end part 32c of the core 32 and the other end thereof may contact the inner stepped part 21h of the valve body 20.

Moreover, in the above embodiment, the first pressure of the first valve chamber 14 is the suction pressure Ps of the variable capacity compressor, the second pressure of the second valve chamber 15 is the discharge pressure Pd of the variable capacity compressor, and the third pressure of the third valve chamber 16 is the pressure Pc of the crank chamber of the variable capacity compressor, but these are not limited thereto, and the first pressure of the first valve chamber 14 may be the pressure Pc of the crank chamber of the variable capacity compressor, the second pressure of the second valve chamber 15 may be the discharge pressure Pd of the variable capacity compressor, the third pressure of the third valve chamber 16 may be the suction pressure Ps of the variable capacity compressor, and thus the capacity control valve can correspond to various variable capacity compressors.

REFERENCE SIGNS LIST 1 capacity control valve
10 valve main body
11 first communication passage
12 second communication passage
13 third communication passage
14 first valve chamber
15 second valve chamber
15a main valve seat
16 third valve chamber
17 valve hole
20 valve body
21 main valve body
21a shutoff valve part
21c main valve part
23 adapter
23d auxiliary valve part
24 pressure-sensitive body
24a bellows
24d flange part
26 locking part
26c auxiliary valve seat
26d pressing part
27a shutoff valve
27b main valve
27c auxiliary valve
29 intermediate communication passage
30 solenoid
31 electromagnetic coil
32 core
35 plunger
36 rod
37 spring (second biasing member)
43 spring (first biasing member)
Fsol magnetic attractive force
Ps suction pressure (first pressure) (third pressure)
Pd discharge pressure
Pc control chamber pressure (third pressure) (first pressure)
Pset suction pressure set value

The invention claimed is:

1. A capacity control valve for controlling a flow rate or pressure of a variable capacity compressor according to a valve opening of a valve section, the capacity control valve comprising:
a valve main body having a first communication passage through which a fluid at a first pressure passes, a second communication passage which is arranged adjacent to the first communication passage and through which a fluid at a second pressure passes, a third communication passage which is arranged adjacent to the second communication passage and through which a fluid at a third pressure passes, a valve chamber consecutively provided with the third communication passage, and a main valve seat arranged in a valve hole for communicating the second communication passage and the third communication passage;
a solenoid which drives a rod having an auxiliary valve seat;
a valve body having an intermediate communication passage for communicating the first communication passage and the third communication passage, a main valve part for opening and closing the valve hole by separating from and contacting the main valve seat, and an auxiliary valve part fitted to the main valve part for opening and closing the intermediate communication passage by separating from and contacting the auxiliary valve seat;
a first biasing member which biases the main valve part in a valve closing direction thereof;
a second biasing member which biases the main valve part in a valve opening direction thereof; and
a pressure-sensitive body arranged in the valve chamber;
wherein the pressure-sensitive body expands and contracts according to the first pressure transmitted through the first communication passage and the intermediate communication passage when the auxiliary valve part is closed, and
the rod relatively moves to the valve body, and opens and closes the auxiliary valve part.

2. The capacity control valve according to claim 1, characterized in that the first biasing member is arranged between the rod and the valve body.

3. The capacity control valve according to claim 1, characterized in that the first biasing member is arranged between the solenoid and the valve body.

4. The capacity control valve according to claim 1, characterized in that:
the solenoid further includes a plunger connected to the rod, a core arranged between the plunger and the valve main body, and an electromagnetic coil; and
the second biasing member is arranged between the plunger and the core.

5. The capacity control valve according to according to claim 1, characterized in that the first pressure is a suction pressure of the variable capacity compressor, the second pressure is a discharge pressure of the variable capacity compressor, and the third pressure is a pressure of a crank chamber of the variable capacity compressor.

6. The capacity control valve according to according to claim 1, characterized in that the first pressure is a pressure of the crank chamber of the variable capacity compressor, the second pressure is a discharge pressure of the variable capacity compressor, and the third pressure is a suction pressure of the variable capacity compressor.

7. The capacity control valve according to claim 2, characterized in that:
the solenoid further includes a plunger connected to the rod, a core arranged between the plunger and the valve main body, and an electromagnetic coil; and
the second biasing member is arranged between the plunger and the core.

8. The capacity control valve according to according to claim 2, characterized in that the first pressure is a suction pressure of the variable capacity compressor, the second pressure is a discharge pressure of the variable capacity compressor, and the third pressure is a pressure of a crank chamber of the variable capacity compressor.

9. The capacity control valve according to according to claim 2, characterized in that the first pressure is a pressure of the crank chamber of the variable capacity compressor, the second pressure is a discharge pressure of the variable capacity compressor, and the third pressure is a suction pressure of the variable capacity compressor.

10. The capacity control valve according to claim 3, characterized in that:
the solenoid further includes a plunger connected to the rod, a core arranged between the plunger and the valve main body, and an electromagnetic coil; and
the second biasing member is arranged between the plunger and the core.

11. The capacity control valve according to according to claim 3, characterized in that the first pressure is a suction pressure of the variable capacity compressor, the second pressure is a discharge pressure of the variable capacity compressor, and the third pressure is a pressure of a crank chamber of the variable capacity compressor.

12. The capacity control valve according to according to claim 3, characterized in that the first pressure is a pressure of the crank chamber of the variable capacity compressor, the second pressure is a discharge pressure of the variable capacity compressor, and the third pressure is a suction pressure of the variable capacity compressor.

13. The capacity control valve according to according to claim 4, characterized in that the first pressure is a suction pressure of the variable capacity compressor, the second pressure is a discharge pressure of the variable capacity compressor, and the third pressure is a pressure of a crank chamber of the variable capacity compressor.

14. The capacity control valve according to according to claim 4, characterized in that the first pressure is a pressure of the crank chamber of the variable capacity compressor, the second pressure is a discharge pressure of the variable capacity compressor, and the third pressure is a suction pressure of the variable capacity compressor.

* * * * *